United States Patent [19]

Aichinger et al.

[11] 4,442,539
[45] Apr. 10, 1984

[54] MEASURING INSTRUMENT FOR THE OPTICAL FOCAL SPOT

[75] Inventors: Horst Aichinger, Fuerth; Kurt Franke, Erlangen, both of Fed. Rep. of Germany

[73] Assignee: Siemens Aktiengesellschaft, Berlin & Munich, Fed. Rep. of Germany

[21] Appl. No.: 268,811

[22] Filed: Jun. 1, 1981

[30] Foreign Application Priority Data

Jun. 19, 1980 [DE] Fed. Rep. of Germany ....... 3022968

[51] Int. Cl.³ .............................................. H05G 1/26
[52] U.S. Cl. ..................................... 378/207; 378/99
[58] Field of Search ................. 378/99, 207, 162, 163, 378/164

[56] References Cited

U.S. PATENT DOCUMENTS

| | | | |
|---|---|---|---|
| 3,013,157 | 12/1961 | Norton, Jr. | 378/207 |
| 3,028,544 | 4/1962 | Stone | 356/386 |
| 3,515,870 | 6/1970 | Marquis | 378/163 |
| 3,928,767 | 12/1975 | Röeck | 378/162 |
| 4,179,100 | 12/1979 | Sashin et al. | 378/99 |

FOREIGN PATENT DOCUMENTS 2438856 of 1980 France .

OTHER PUBLICATIONS

Snow, "Self-Scanning Photodiode Arrays for Spectroscopy", Research Development, Apr. 1976, pp. 18–22.
Bernstein et al., "An X-ray Pinhole Camera with Nanosecond Resolution", The Review of Scientific Instruments, vol. 41, No. 12, Dec. 1970, pp. 1843-1845.
"Final Draft on Focal Spot Characteristics", International Electrotechnical Commission of 10/30/79, pp. 1–34.
Brochure, "RETICON Product Summary Solid State Image Sensors", Reticon Corporation, Mountain View, CA, 4 pp., 1972.

Primary Examiner—Alfred E. Smith
Assistant Examiner—Carolyn E. Fields
Attorney, Agent, or Firm—Hill, Van Santen, Steadman & Simpson

[57] ABSTRACT

A pinhole camera forms an image of the optical focal spot of an x-ray tube on a radiation-electrical transducer comprising an intensifier foil and a matrix of photo-sensitive detectors. A processing circuit including an adjustable amplitude selector selects detector output signals for transmission to a video monitor. A calibrated measuring grid can be superimposed on the focal spot image on the monitor.

2 Claims, 2 Drawing Figures

MEASURING INSTRUMENT FOR THE OPTICAL FOCAL SPOT

BACKGROUND OF THE INVENTION

The invention relates to a measuring instrument for measuring the optical focal spot of an x-ray tube, comprising a pinhole camera for forming an image of the focal spot on a radiation-sensitive detector. Measuring instruments of this type serve the purpose of determining the size of the optical focal spot of an x-ray tube and the intensity distribution on the focal spot.

In the publication "Final draft on focal spot characteristics" of the International Electrotechnical Commission of Oct. 30, 1979, a measuring arrangement of this type is described. A pinhole diaphragm of a pinhole camera is brought into the center of the path of rays being issued by the anode of an x-ray tube and generates a radiograph of the focal spot on an x-ray sensitive fine grain film. Through suitable selection of the spacings between the pinhole diaphragm and the film plane, and between the focus and the pinhole diaphragm, the image of the focal spot can be enlarged. However, on account of the low sensitivity of the x-ray film and the maximally allowable tube load, only an approximately triple enlargement, as the maximum, can be attained. Therefore, for a precise measurement, the radiograph must be yet further enlarged by optical means. Due to the necessary steps, development and exposure of the film, and the optical enlargement for the purpose of measurement, this method is shown to be complicated and time-consuming. Since the film has a logarithmic transmission behavior, the intensity distribution in the focal spot must first be ascertained by way of computation via the characteristic curve of the film. Since the film development has a great influence on the slope of the characteristic curve, a precise check (or inspection) of the development is necessary.

SUMMARY OF THE INVENTION

The invention proceeds from the object of producing a measuring instrument of the type initially cited which, with simple handling, renders possible, in the briefest time, a precise measurement of the optical focal spot.

In accordance with the invention, the object is achieved in that the detector is a radiation-electric converter, and that a processing circuit is present which determines, from the output signals of the detector, the detector field struck by radiation. The radiography is hereby converted into electrical signals which subsequently immediately reproduce the size of the focal spot on a display device.

A simple optical representation of the size of the focal spot and the intensity distribution thereon is achieved if the processing circuit is connected to a television monitor for the purpose of representation of the focal spot. Expediently the detector is comprised of a matrix of radiation-sensitive individual detectors. The activation of the individual detectors is simplified if, in the processing circuit, shift registers are provided for a parallel-serial conversion of the output signals of the individual detectors which are present in parallel form, and if the thus generated serial output signal is converted, in a further circuit, into a standardized video signal. The measurement of the intensity distribution of the image of the optical focal spot is rendered possible if an adjustable amplitude discriminator is provided in the processing circuit. Light sensitive detectors can be employed if, in radiation direction in front of the detector, an intensifier foil is arranged for the conversion of an x-ray image into a visible image, and if the detector is a photosensitive converter.

The invention shall be explained in greater detail in the following on the basis of an exemplary embodiment illustrated on the accompanying drawing sheet; and other objects, features and advantages will be apparent from this detailed disclosure and from the appended claims.

DETAILED DESCRIPTION

Figure 1:
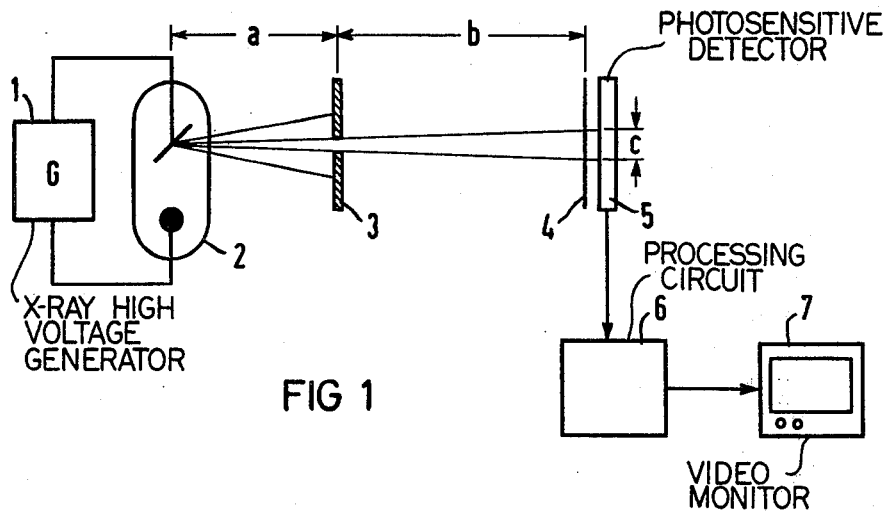
FIG. 1 shows a basic representation of an inventive measuring arrangement.

In FIG. 1, an x-ray generator 1 is illustrated which supplies an x-ray tube 2. The radiation beam issuing from the anode of the x-ray tube 2 is bounded (or limited) by a standardized pinhole diaphragm 3—arranged at the interval a—of a pinhole camera. An image is formed of the optical focal spot on a finely-delineating intensifier foil 4, disposed at an interval b from the pinhole diaphragm 3, which intensifier foil is, for example, employed in mammography. The output signal—corresponding to the image on the intensifier foil 4—of a following photosensitive detector 5 is converted into video signals in a processing circuit 6 which shall be described later, which video signals are imaged on a monitor 7.

The ratio of the interval: pinhole diaphragm—detector (b), to the interval: focus-pinhole diaphragm (a), indicates the magnification (or enlargement) factor of the image of the focal spot formed on the intensifier foil 4. On the basis of the dimension of the image, (c), the size of the focal spot can be ascertained by way of computation.

Figure 2:
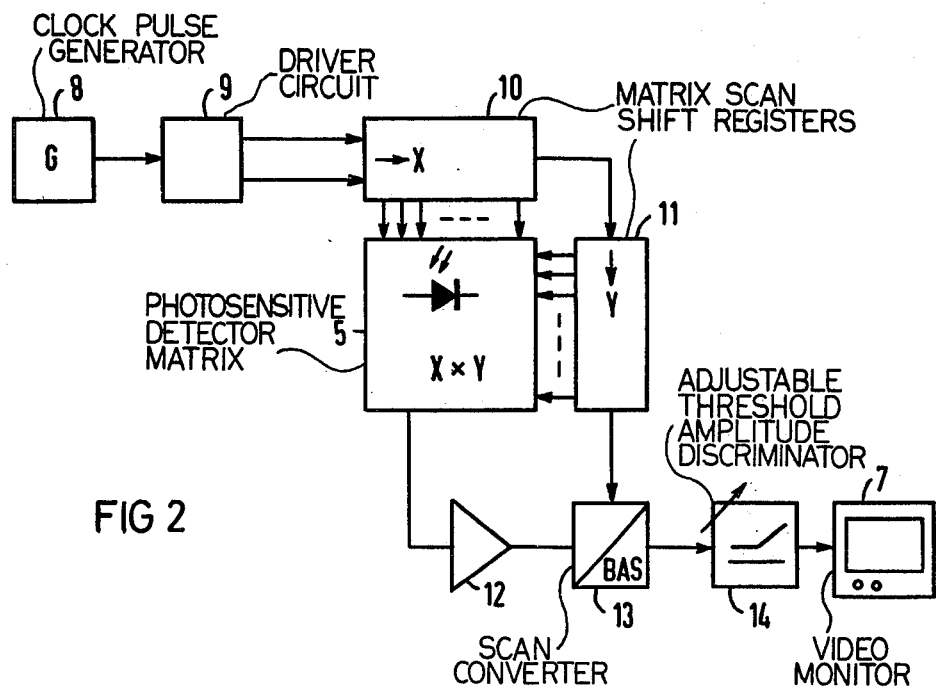
FIG. 2 shows a block circuit diagram of the processing circuit according to FIG. 1.

In FIG. 2, a clock pulse generator 8 is connected with a driver 9 which delivers clock pulse signals and start signals for an X- and a Y-shift register, 10, 11. The shift registers 10, 11 activate, in the detector 5, X-$\times$Y-individual detectors integrated in the form of a matrix; for example, photodiodes. At the commencement of a scan cycle one bit is read into each of the shift registers 10, 11 and further shifted (or advanced) in the X-shift register 10 at the clock pulse rate of the clock pulse generator 8. When the bit arrives at the output of the shift register 10, the bit in the Y-shift register 11 is shifted (or advanced) by one position in the Y-shift register, while a new bit is read into the X-shift register 10 and then shifted therethrough at the clock pulse rate. In the case of coincidence of the signals of the shift registers 10, 11, the corresponding photodiode is activated. The output signals of the photodiodes which are successively selected in this manner are proportional to the radiation intensity and are amplified in an amplifier 12, and, in a converter 13, following synchronization by the image-end-signal from the Y-shift register 11, the amplified output signals are converted into a standardized video signal. Through an adjustable amplitude discriminator 14 all the amplitudes beneath an adjusted threshold can be suppressed. Thus, by variation of the size of the selected threshold amplitude, the amplitude distribution of the video signal, and hence directly the intensity distribution of the image of the focal spot, can be measured. The output signal of the amplitude discriminator 14 is displayed on the monitor 7.

Determined by the sensitivity of the photodiodes with the associated ("preconnected") intensifier foil and the geometric size of the diode matrix, through variation of the intervals a, b, a maximum enlargement (or magnification) of approximately five can be adjusted. In dependence upon the number of individual detectors, the television picture appears yet further enlarged (or magnified) in relation to the image of the focal spot. The focal spot size can be determined from the size of the television image through measurement and subsequent conversion. In order to dispense with a conversion of this type, expediently a measuring reticle (or reticle grid) is superimposed on the television picture, so that the size of the focal spot can be determined in the simplest manner. This measuring reticle, taking into account the intervals a, b and the television enlargement (or magnification) can represent a calibrated measuring rod.

It will be apparent that many modifications and variations may be effected without departing from the scope of the novel concepts and teachings of the present invention.

We claim as our invention:

1. A measuring instrument for measuring the optical focal spot of an x-ray tube, comprising a pinhole camera for the purpose of forming an image of the focal spot, and a radiation-sensitive detector, said detector comprising a radiation-electrical transducer in the form of a matrix of photo-sensitive individual detectors for supplying respective output signals, a processing circuit comprising output means connected with the photo-sensitive individual detectors of said matrix for reading out the output signals of said detectors to generate a video signal in accordance with a visible light image incident on said matrix, and a video monitor connected with said output means for displaying the focal spot as represented by said video signal, said processing circuit including an adjustable amplitude selector means for selecting a desired amplitude range of said output signals for transmission to said video monitor via said output means, and an intensifier foil arranged in front of said matrix of photo-sensitive individual detectors for the conversion of an x-ray image of the focal spot into a visible light image incident on said matrix.

2. A measuring instrument according to claim 1, wherein a calibrated measuring grid is superimposed on the displayed focal spot of the video monitor such that the actual dimensions of the focal spot can be directly observed.

* * * * *